(12) United States Patent
Snoke et al.

(10) Patent No.: US 12,507,750 B2
(45) Date of Patent: Dec. 30, 2025

(54) ARTICLE OF APPAREL INCLUDING PROTECTIVE PANELS

(71) Applicant: Under Armour, Inc., Baltimore, MD (US)

(72) Inventors: Margaret Snoke, Baltimore, MD (US); Kayla Stevens, Baltimore, MD (US); Caitlyn Taggart, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 415 days.

(21) Appl. No.: 17/853,892

(22) Filed: Jun. 29, 2022

(65) Prior Publication Data

US 2023/0000185 A1    Jan. 5, 2023

Related U.S. Application Data

(60) Provisional application No. 63/202,914, filed on Jun. 30, 2021.

(51) Int. Cl.
| | |
|---|---|
| *A41D 13/05* | (2006.01) |
| *A41D 13/015* | (2006.01) |
| *B32B 3/26* | (2006.01) |
| *B32B 5/18* | (2006.01) |
| *B32B 5/24* | (2006.01) |
| *B32B 7/14* | (2006.01) |
| *B32B 27/12* | (2006.01) |

(52) U.S. Cl.
CPC ....... *A41D 13/0543* (2013.01); *A41D 13/015* (2013.01); *B32B 3/266* (2013.01); *B32B 5/18* (2013.01); *B32B 5/245* (2013.01); *B32B 7/14* (2013.01); *B32B 27/12* (2013.01); *B32B 2307/51* (2013.01); *B32B 2437/00* (2013.01)

(58) Field of Classification Search
CPC .. A41D 13/0543; A41D 13/015; A41D 13/05; A41D 31/245; B32B 3/266; B32B 5/18; B32B 5/245; B32B 7/14; B32B 27/12; B32B 2307/51
See application file for complete search history.

(56) References Cited

U.S. PATENT DOCUMENTS

| | | | | |
|---|---|---|---|---|
| 4,668,557 A | * | 5/1987 | Lakes | B29C 44/5636 428/314.2 |
| 10,448,679 B1 | * | 10/2019 | Roddis | A41C 3/12 |
| 2017/0156443 A1 | * | 6/2017 | Guyan | A43B 23/028 |
| 2018/0325216 A1 | * | 11/2018 | Toronjo | A43B 23/0265 |
| 2018/0338572 A1 | * | 11/2018 | Cross | A43B 13/04 |
| 2020/0196705 A1 | * | 6/2020 | Toronjo | A43B 1/0009 |

FOREIGN PATENT DOCUMENTS

| | | | | | |
|---|---|---|---|---|---|
| CN | 107338572 A | * | 11/2017 | | D04B 35/02 |
| GB | 2596050 A | * | 12/2021 | | B32B 5/022 |

OTHER PUBLICATIONS

Machine Translation CN10738572 (Year: 2017).*

* cited by examiner

*Primary Examiner* — Jennifer A Steele (74) *Attorney, Agent, or Firm* — Maginot, Moore & Beck, LLP (57) ABSTRACT

An article of apparel includes protective padding adapted to contour to the wearer. In an embodiment, the protective panel is a multilayered panel including a foam layer, a fabric layer, and a bonding layer located between the foam layer and the fabric layer. The foam layer may be formed of auxetic foam. Alternatively or in addition to, the bonding layer may be a film including a plurality of openings, and each of the openings defines a reentrant shape.

20 Claims, 7 Drawing Sheets

ARTICLE OF APPAREL INCLUDING PROTECTIVE PANELS

CROSS-REFERENCE TO RELATED APPLICATIONS

This application claims priority from U.S. Provisional Patent Application No. 63/202,914, filed Jun. 30, 2021, the entire contents of which are incorporated herein by reference.

FIELD

This document relates to the field of apparel, including active apparel, active wear, athletic apparel, protective gear and padding, sports uniforms, garments, or other products configured to be worn or carried on the body.

BACKGROUND

Some articles of apparel include pads designed to absorb impacts from other competitors, to cushion falls, and to generally protect the wearer during physical activities. Typically, this type of apparel fits closely to the human body so that the pads are positioned over a specified area. For example, a pair of athletic pants may include pads over the thighs, hips, and/or knees to cushion falls. It is desirable for the pads to remain over the specified areas in response to all movements of the wearer, so that the apparel is comfortable and also so that the pads are properly positioned for absorbing impacts.

When designing an article of apparel for a close fit to the human body, different body shapes and sizes must be considered. Different individuals within a particular garment size will have different body shapes and sizes. For example, two individuals wearing the same pant size may have very different waist to inseam dimensions. These variable measurements between similarly sized individuals makes proper design of closely fitting garments difficult.

In addition to accounting for different body measurements for different individuals within a size, various contours of the human body must also be considered when designing closely fitting articles of apparel. If a garment is not properly sized for a particular wearer, the wearer may experience undesirable tightness, looseness, or bunching at various locations in response to normal movements, such as when crouching or squatting in a pair of athletic pants. An improper fit may result in discomfort, excessive wear, or bending or creasing of the garment at the poorly fitting locations. Additionally, the improper fit may result in the shifting and/or bunching of the protective padding included in the apparel.

In view of the foregoing, it would be desirable to provide a garment or other article of apparel capable of conforming to various body shapes within a given size range. It would also be desirable to provide a garment or other article of apparel that includes padding to protect the wearer from impacts. In addition, it would be desirable for such a garment or article of apparel to be relatively inexpensive and easy to manufacture.

SUMMARY

In accordance with one exemplary embodiment of the disclosure, protective padding adapted to contour to the wearer is provided. For example, the protective padding is a multilayer panel possessing a low or a negative Poisson's ratio value. The protective padding may be incorporated into an article of apparel at selected apparel locations. By way of example, there is provided an article of apparel including an auxetic foam layer, a fabric layer, and a bonding layer located between the auxetic foam layer and the fabric layer. The bonding layer defines a plurality of openings, and each of the openings defines a reentrant shape.

In accordance with another exemplary embodiment of the disclosure, an article of apparel includes an auxetic foam layer and a bonding layer bonded to the auxetic foam layer and defining a plurality of openings. Each of the openings defines a reentrant shape, and the plurality of openings configures the bonding layer as an auxetic.

In a further exemplary embodiment of the disclosure, an article of apparel includes an auxetic layer that is auxetic in three dimensions, and a bonding layer bonded to the auxetic layer. The bonding layer is auxetic in only two dimensions.

BRIEF DESCRIPTION OF THE FIGURES

The foregoing aspects and other features of an article of apparel are explained in the following description, taken in connection with the accompanying drawings.

DETAILED DESCRIPTION

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Figure 1:
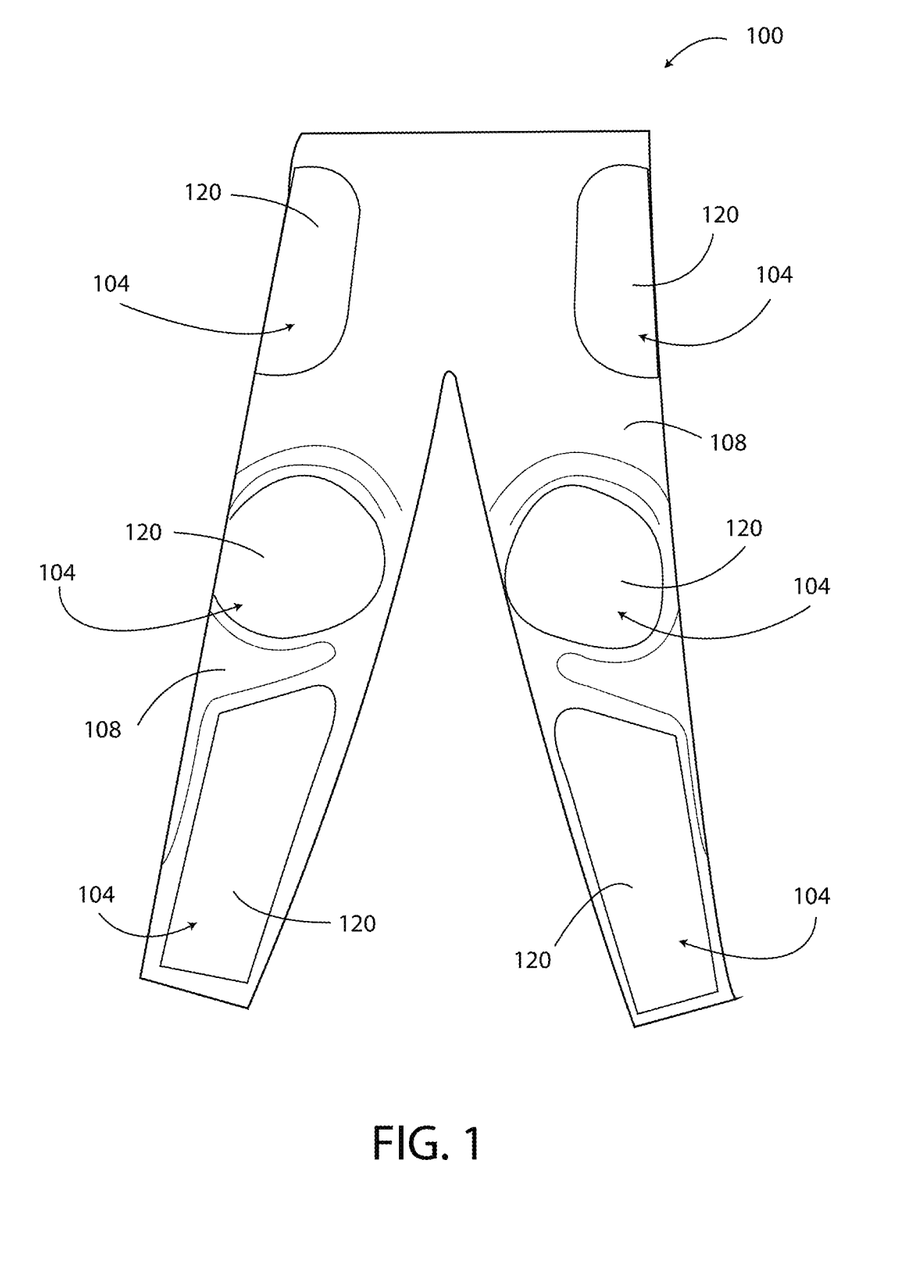
FIG. 1 is an elevational view of an article of apparel including auxetic panels.

As shown in FIG. 1, an article of apparel 100 includes six protective panels 104. The article of apparel 100 is pants configured, in one embodiment, for athletic events in which impacts occur, such as soccer, football, baseball, basketball, martial arts, and the like. As disclosed herein, the article of apparel 100 is typically worn tight against the wearer's body with the protective panels 104 covering the wearer's hips, knees, and/or shins. The article of apparel 100 positions the panels 104 to cover and to protect certain portions of the wearer's body from impacts. The article of apparel 100 including the panels 104 provides the wearer with impact resistance that is comfortable and lightweight. Moreover, the article of apparel 100 with the panels 104 also provides the wearer with a fit that resists wear, bending, and creasing in response to movements of the wearer during crouching, squatting, kicking, bending, and the like. Therefore, the article of apparel 100 with the panels 104 has the same or better comfortable range of motion as a pair of leggings or tights without the panels 104.

The term "article of apparel" as used herein refers to any garment, footwear, or accessory configured to be worn on or carried by a human. Examples of the article of apparel 100 include, helmets, hats, caps, shirts, pants, shorts, sleeves, knee pads, wrist pads, elbow pads, shoes, boots, backpacks, duffel bags, cinch sacks, and straps, as well as numerous other products configured to be worn on or carried by a person.

The term "impact" as used herein includes the types of impacts that an athlete typically endures during sporting events, practice, competition, and the like. The type of impact varies by sport, and may include impacts to the shins while playing soccer, falling hard on the knees while playing football, sliding to reach a base while playing baseball, and strikes to the body and legs in martial arts.

Based on the above, to suit a particular sport or athletic activity, the article of apparel 100 may include a different configuration of the panels 104 than is shown in FIG. 1, such as one or more shin panels, one or more knee panels, one or more hip panels, and any other combination of the panels 104. Some embodiments of the article of apparel 100 include additional panels 104 such as tailbone protection, crotch protection, and/or groin protection. An additional embodiment, the article of apparel 100 is formed from one panel 104 that encompasses the entire article of apparel 100 or substantially the entire of the article of apparel 100. For example, the article of apparel 100 may be an athletic knee pad the entirety of which is a protective panel 104. The protective panels 104 are also referred to herein as padding panels, compression panels, or shaping panels.

Figure 2:
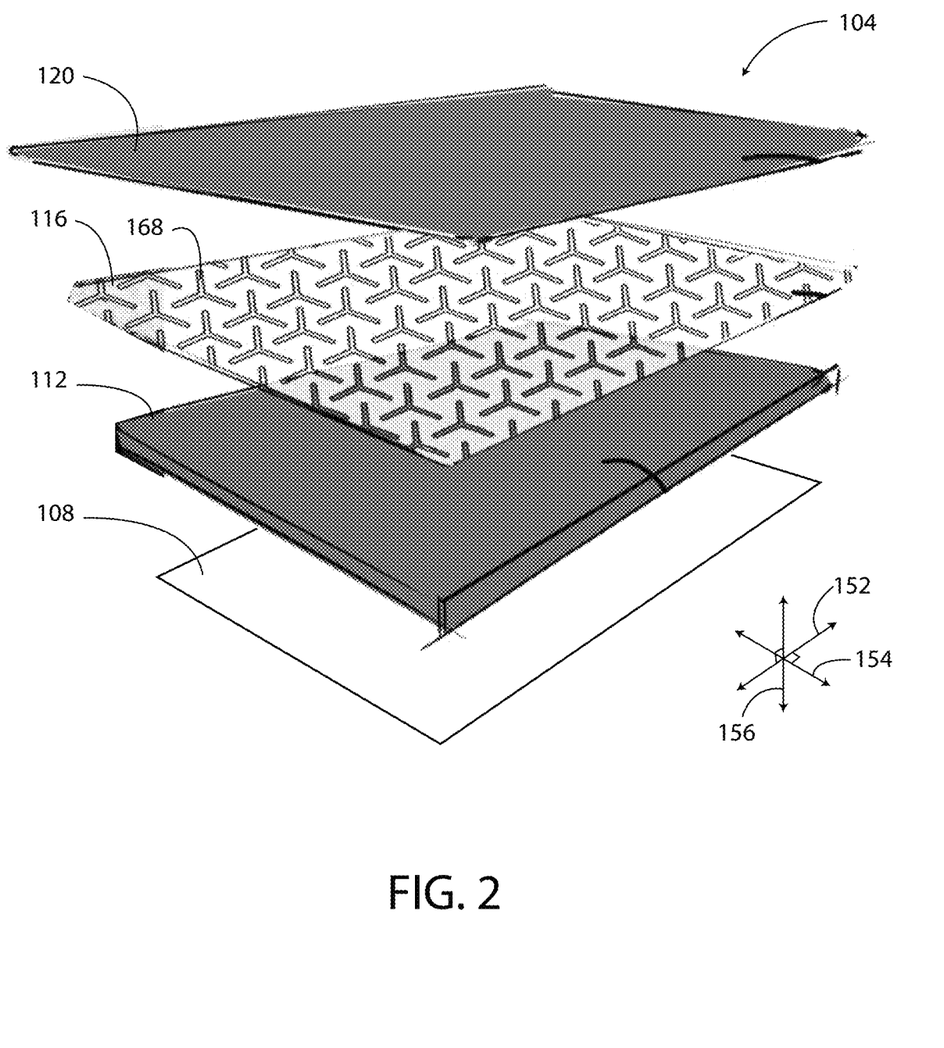
FIG. 2 is an exploded sectional view of an auxetic panel of FIG. 1 showing a base fabric layer, an auxetic layer, a bonding layer, and an outer fabric layer.

As shown in FIG. 2, an exemplary protective panel 104 includes four layers including a base fabric layer 108, an foam layer 112, a bonding layer 116, and an outer fabric layer 120. In comparison, regions of the article of apparel 100 not including (spaced apart from) the protective panels 104 may include only the base fabric layer 108. Stated another way, one or more of the foam layer 112, the bonding layer 116, and the outer fabric layer 120 is not present at regions of the article of apparel 100 spaced apart from the auxetic panels 104. Each layer of the auxetic panels 104 is described herein.

The base fabric layer 108, which is also referred to herein a first fabric layer, a material layer, a textile layer, and an inner layer, is positioned closest to the wearer's skin. The base fabric layer 108 forms the basic garment. For example, in FIG. 1, the pants are formed by the base fabric layer 108. The base fabric layer 108 is a stretchable material, such as Lycra®, Spandex®, or other types of elastane fabric. In one embodiment, the base fabric layer 108 is a compression fabric that fits tightly against the wearer's body. Compression fabric is configured to fit tightly to the body, applying pressure thereto. For example, the compression fabric may possess a compression level of at least four mmHg, including 8-15 mmHg (low), 15-20 mmHg (medium), and 20-30 mmHg (high). The base fabric layer 108 may be a low friction textile to enable sliding along the wearer's skin for comfortable movement of the panels 104 relative to the skin.

With reference to FIG. 2, the foam layer 112 is positioned on the base fabric layer 108. In one embodiment, the foam layer 112 is not bonded to the base fabric layer 108; accordingly, movement of the foam layer 112 relative to the base fabric layer 108 may occur in response to movements of the wearer and in response to deformation of the auxetic layer 112.

An exemplary foam layer 112 is formed from auxetic foam, such that the auxetic layer 112 is an auxetic foam layer. Conventional foams have uniform physical properties and positive Poisson's ratios. Auxetic foam, in contrast, possess a negative Poisson's ratios. Accordingly, under tensile load, auxetic foam experiences transverse expansion when stretched in an axial direction. Upon application of a compressive load (such as an impact), moreover, auxetic foam contracts in the transverse direction (when compressed in the axial direction). Exemplary auxetic foams include auxetic polyurethane foams manufactured by Auxadyne, LLC. The auxetic layer 112 may include a sheet of the auxetic foam (i.e. an auxetic foam layer) that is from 5 mm to 5 cm in thickness. In a preferred embodiment, the auxetic foam 112 is approximately 10 mm thick. The auxetic foam may possess a density of from approximately 20 kg/m$^3$ to 40 kg/m$^3$ in a relaxed state. In the relaxed state, no external compressive or tensile forces are acting on the auxetic layer 112. The term "approximately," as used herein, means within 5% of the stated value. By way of specific example, the auxetic foam is a 60 ppi polyester urethane foam with a density of approximately 25-35 kg/m$^3$.

In one embodiment, the auxetic foam of the auxetic layer 112 is produced by heating a standard open cell foam (e.g., a polyurethane foam) and compressing the heated foam in all three dimensions. The auxetic foam is then cooled while under compression. Such processing transforms the standard open cell foam into a foam in which ribs/walls defining the foam cells are buckled inwardly to form a reentrant cell structure. The reentrant cell structure causes the foam to become auxetic.

The term "auxetic," as used herein, generally refers to a material or structure that has a negative Poisson's ratio.

The term "Poisson's ratio" is a measure of the Poisson effect and is defined as the negative ratio of a transverse strain to an axial strain. Thus, for example, when a tension force is applied to the auxetic layer 112 along an axis 152 (FIG. 2) resulting in a positive strain, the auxetic layer 112 is configured to exhibit positive strain along axes 154, 156 (FIG. 2) that are perpendicular to the axis 152 (i.e. the material expands in directions transverse to the direction of stretching). Similarly, when a compressive force is applied to the auxetic layer 112 along an axis 156 resulting in a negative strain, the auxetic layer 112 is configured to exhibit negative strain along the axes 152, 154 that are perpendicular to the axis 156. Upon release of the tension or compressive force upon the auxetic layer 112, the recovery power of the auxetic layer 112 returns the layer 112 to its original shape/dimensions.

Whether a structure has a negative Poisson's ratio and is auxetic, may depend upon the degree to which the structure is stretched. Some structures have a negative Poisson's ratio up to a certain stretch threshold, but when stretched past the threshold have a positive Poisson's ratio. For example, when the auxetic layer 112 is stretched lengthwise past a threshold, the cells and segments of the auxetic layer 112 may be stretched to an extent that the auxetic layer 112 becomes slightly thinner before the layer is torn apart or otherwise damaged. Accordingly, the term "auxetic" as used herein refers to structures or materials that have a negative Poisson's ratio within certain stretch thresholds. Furthermore, while the term "auxetic" is used to refer to a structure that has a negative Poisson's ratio, it will be recognized that structures may be "near auxetic". A "near auxetic" structure is a structure having a Poisson's ratio of approximately zero or less than 0.15.

With reference to FIG. 2, the bonding layer 116 is an intermediate adhesive layer located between the outer fabric layer 120 and the auxetic layer 112. In one embodiment, the bonding layer 116 includes a heat-activated adhesive applied to a film, material, fabric, textile, or cloth. The bonding layer 116 may include any suitable type of adhesive. The bonding layer 116 includes adhesive on both an upper side and a lower side and, accordingly, is a dual-sided adhesive layer (i.e. double-sided tape). The lower side of the bonding layer 116 is bonded to the auxetic layer 112, and the upper side of the bonding layer 116 is bonded to the outer fabric layer 120, such that the bonding layer 116 glues the outer fabric layer 120 to the auxetic layer 112. In one embodiment, the bonding layer 116 includes a thin polymer film formed from polypropylene and/or polyurethane. Exemplary materials produced by Bemis Associates Inc., which are suitable for use as the bonding layer 116 include Bemis® Flowfree™ and Bemis® High Recovery. The bonding layer 116 has a high recovery of from 95% to 100%. The bonding layer 116 is also referred to as Bemis® tape and Bemis® film.

Figure 3:
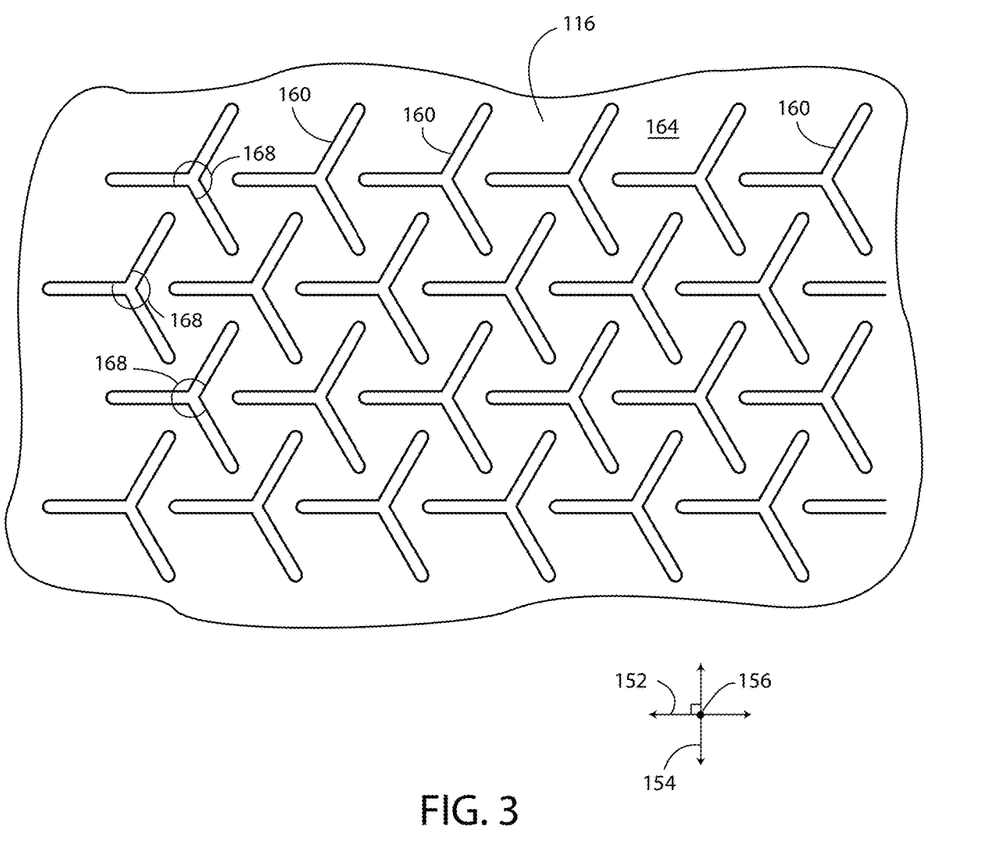
FIG. 3 is a plan view of the bonding layer including an array of reentrant openings formed therethrough.

As shown in FIGS. 2 and 3, the bonding layer 116 includes a plurality of openings 160 formed therein, which configures the bonding layer 116 as an auxetic, which is also referred to as an auxetic material. The bonding layer 116 including the openings 160 is configured to exhibit an auxetic response in two dimensions. In one embodiment, the openings 160 are laser cut into the bonding layer 116. The pattern of openings 160 drive the expansion and/or stretch of the bonding layer 116 and also effectively change the Poisson's ratio of the bonding layer 116 to a negative value. For example, the bonding layer 116 with the openings 160 is auxetic at least in response to tensile forces along the axes 152, 154, which are parallel to a surface 164 of the bonding layer 116.

For purposes of this disclosure, a material is an "auxetic" and/or exhibits "auxetic properties" or an "auxetic response" by reacting to an applied stress or force by deforming in a manner that results in a negative Poisson's Ratio.

The plurality of openings 160 are shaped and positioned to configure the bonding layer 116 as an auxetic bonding layer. The openings 160 are reentrant shapes, which include one or more internal angles 168 that are reflexive (i.e. possessing a value between 180°-360°. In the field of geometry, a reentrant shape may also be referred to as a "concave", or "non-convex" polygon or shape, which is a shape having an interior angle 168 with a measure that is greater than 180°. In FIG. 3, the bonding layer 116 includes an array of the openings 160, which all have the same shape and the same rotational orientation. The openings 160 include three reflexive angles 168 with an angle of 240° each.

With reference again to FIGS. 1 and 2, the outer fabric layer 120, which is also referred to herein as cover layer, an outer layer, a second fabric layer, and/or a textile layer is bonded to the bonding layer 116 and is prevented from moving relative to the bonding layer 116. The outer fabric layer 120 is formed, in one embodiment, from four-way stretch fabric or another suitable high recovery material, such as Lycra®, Spandex®, or other types of elastane fabric. The outer fabric layer 120, in some embodiments, is also formed from compression fabric. Accordingly, the outer fabric layer 120 assists in the recovery of the auxetic layer 112 and the bonding layer 116 from a stretched configuration to a relaxed configuration. Moreover, the outer fabric layer 120 promotes a tight positioning of the auxetic panels 104 against the wearer.

In one embodiment, when the auxetic panel 104 is stretched, the elasticity of the outer fabric layer 120 pulls portions of the outer fabric layer 120 into the openings 160 formed in the bonding layer 116. As a result, the reentrant shape of the openings 160 is visible as depressions formed in the outer fabric layer 120.

In use, the article of apparel 100 having the auxetic panels 104 provides the wearer with comfortable impact protection. The article of apparel 100 is comfortable because the auxetic panels 104 conform closely to the contours of the wearer's body without wrinkling, creasing, or bunching. The conforming nature of the auxetic panels 104 is achieved by features of each layer thereof.

Figure 4A:
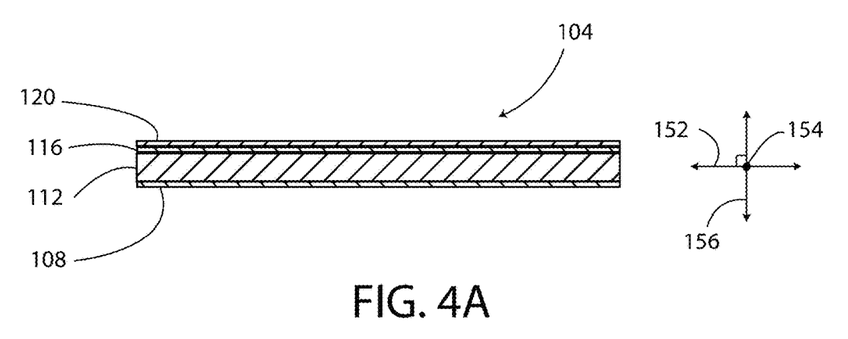
FIG. 4A is cross sectional view of an auxetic panel of FIG. 1 in a relaxed configuration.

The auxetic panels 104 exhibit the auxetic response based on the wearer's movements and based on impacts exerted upon the auxetic panels 104. As shown in FIG. 4A, an unstretched (i.e. relaxed) auxetic panel 104 is shown, and in FIG. 4B, tensile forces are applied to the auxetic panel 104 along the axis 152. In response to the tensile forces, the auxetic panel 104 becomes thicker along the axis 156 and wider along the axis 154. The change in thickness and width occurs due to hinge-like structures within the foam of the auxetic layer 112, which flex when stretched.

Figure 5A:
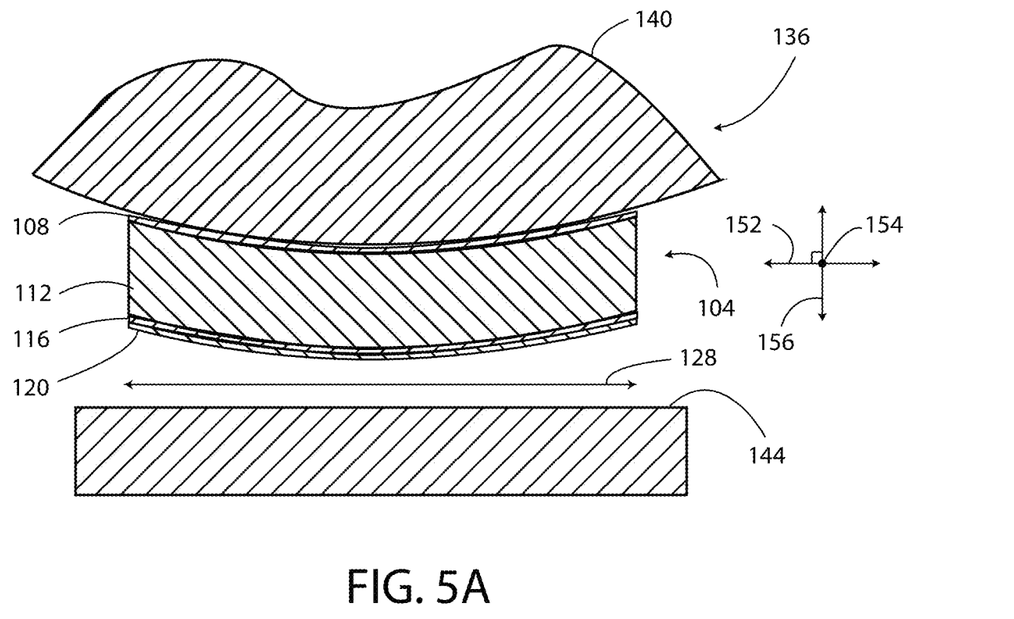
FIG. 5A is a cross sectional view of an auxetic panel of FIG. 1 in a relaxed state and contoured to a wearer's knee.
Figure 5B:
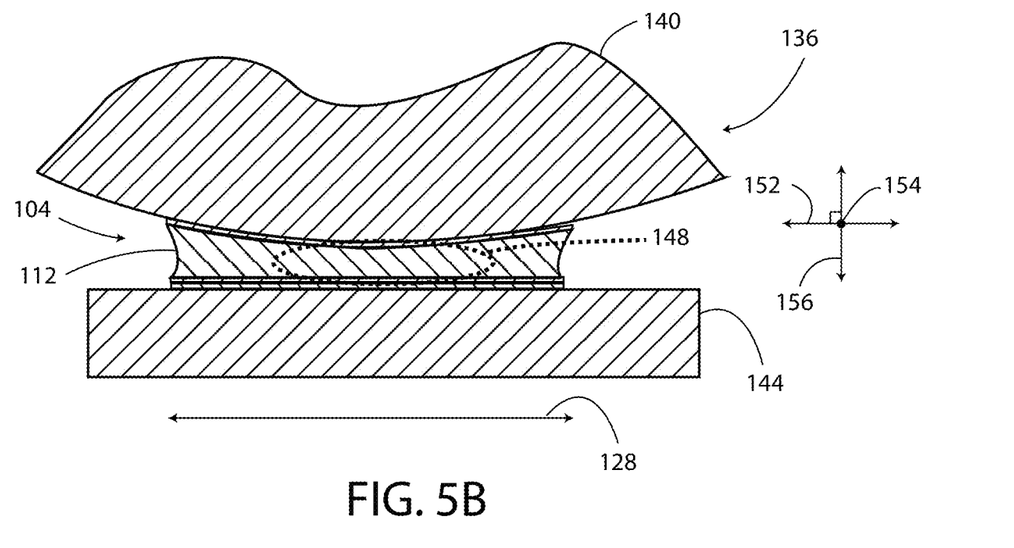
FIG. 5B is a cross sectional view of the auxetic panel of FIG. 5A in response to compressive forces and showing a contraction in size that is characteristic of auxetic materials.

As shown in FIGS. 5A and 5B, the auxetic panel 104 exhibits an auxetic response to a compressive force along the axis 156. The compressive force is perpendicular to the surface 164 (FIG. 3) of the bonding layer 116. As shown in FIG. 5A, the auxetic panel 104 forms to the contours of a joint region 136 of the wearer. The exemplary joint region 136 corresponds to the area of the wearer's knee 140. In FIG. 5A, the joint region 136 and the auxetic panel 104 are spaced apart from the floor 144. In FIG. 5B, the joint region 136 strikes or impacts the floor 144 and compresses the auxetic panel 104 between the floor 144 and the joint region 136 to apply the compressive force to the auxetic panel 104. The compressive force causes an area of the auxetic layer 112 to contract along the axes 152, 154, such that a region of increased density 148 (FIG. 5B) is temporarily formed at the area of impact. The region of increased density 148 absorbs and dissipates impact forces, thereby protecting the joint region 136 and providing impact resistance.

In FIG. 5B, the auxetic panel 104 behaves differently than a non-auxetic panel, which would tend to lengthen, to thin, and to decrease in density at the area of impact in response to the compressive forces along the axis 156. By increasing in density at the area of impact, the auxetic panel 104 offers increased impact protection to the wearer, as compared to a non-auxetic pad.

Figure 4B:
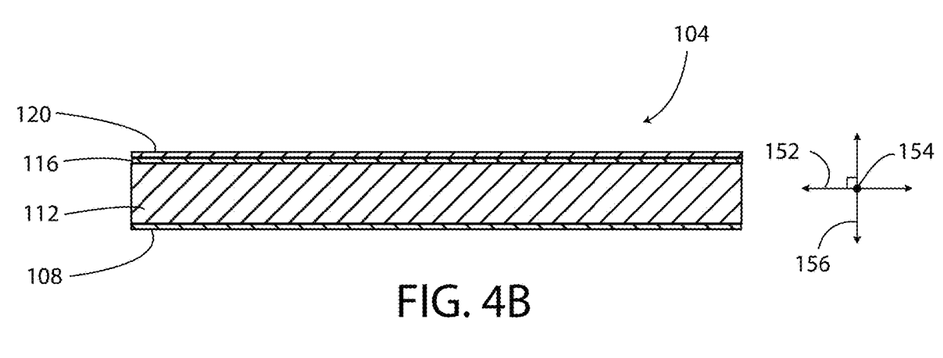
FIG. 4B is a cross sectional view of the auxetic panel of FIG. 4A in response to tensile forces and showing an expansion in size that is characteristic of auxetic materials.

The density of the auxetic layer 112 is selected so that the auxetic layer 112 easily bends around the contours of the wearer's body. The auxetic response of the auxetic panels 104 also promotes the conforming and comfortable characteristics of the article of apparel 100. For example, when the user tightly bends their leg, tensile forces cause the thickness of the auxetic panel 104 to increase, as shown in FIG. 4B. The increase in thickness results in fewer wrinkles and creases in the auxetic panel 104 and increases the comfort for the wearer. The increase in thickness also provides the article of apparel 100 with a smooth and wrinkle free appearance for most or all positions of the wearer, and for many different sizes of wearers.

The bonding layer 116 increases the comfort of the article of apparel 100 by exhibiting an auxetic response that, in one embodiment, is complementary to the auxetic response of the auxetic layer 112. For example, the increase in thickness and width exhibited by the auxetic layer 112 in response to tensile forces along the axis 152 (FIG. 4B), is uninhibited by the bonding layer 116 having the openings 160, which also exhibits an auxetic response to the tensile forces. In one embodiment, the bonding layer 116 and the auxetic layer 112 change size approximately to the same degree in response to tensile forces. In this way, the auxetic response of the auxetic layer 112 is fully achieved and is not diminished or dampened by the bonding layer 116.

The bonding layer 116 with the openings 160 is also complementary to the auxetic response of the auxetic layer 112 when subject to the compressive forces. Specifically, the bonding layer 116 and the outer fabric layer 120 "shrink" or fold in on each other so as not to diminish or dampen the auxetic response of the auxetic layer 112. To this end, in response to an impact, the outer fabric layer 120 may be drawn inside of the openings 160 slightly, and the openings 160 move toward a closed position to enable formation of the area of increased density 148.

The auxetic layer 112 is auxetic in three dimensions, and the bonding layer 116 is auxetic in only two dimensions. Specifically, the bonding layer 116 exhibits an auxetic response only in a plane defined by the two axes 152, 154, which is parallel to the surface 164 of the bonding layer 116. The bonding layer 116 does not become thicker along the axis 156 in response to tensile forces along the axes 152, 154. Moreover, if the bonding layer 116 were isolated and subject to compressive forces along the axis 156, the bonding layer 116 would not exhibit an auxetic response. Thus, in an embodiment, the bonding layer 116 is not auxetic in a third dimension perpendicular to the surface 164 of the bonding layer 116. The bonding layer 116 is only auxetic in two dimensions, because the film-like bonding layer 116 has substantially no thickness in the third dimension along the axis 156. The auxetic layer 112, however, has a sizable thickness in three dimensions and, therefore, is auxetic in all three dimensions. In particular, when stretched by the tensile forces along the axis 152, the auxetic layer 112 exhibits an auxetic response along the axes 154 and 156. The auxetic layer 112 and the bonding layer 116 are both auxetic in the two dimensions defining the surface 164 of the bonding layer 116, and the auxetic layer 116 is auxetic in an additional dimension that is perpendicular to the surface 164 of the bonding layer 116.

Figure 6:
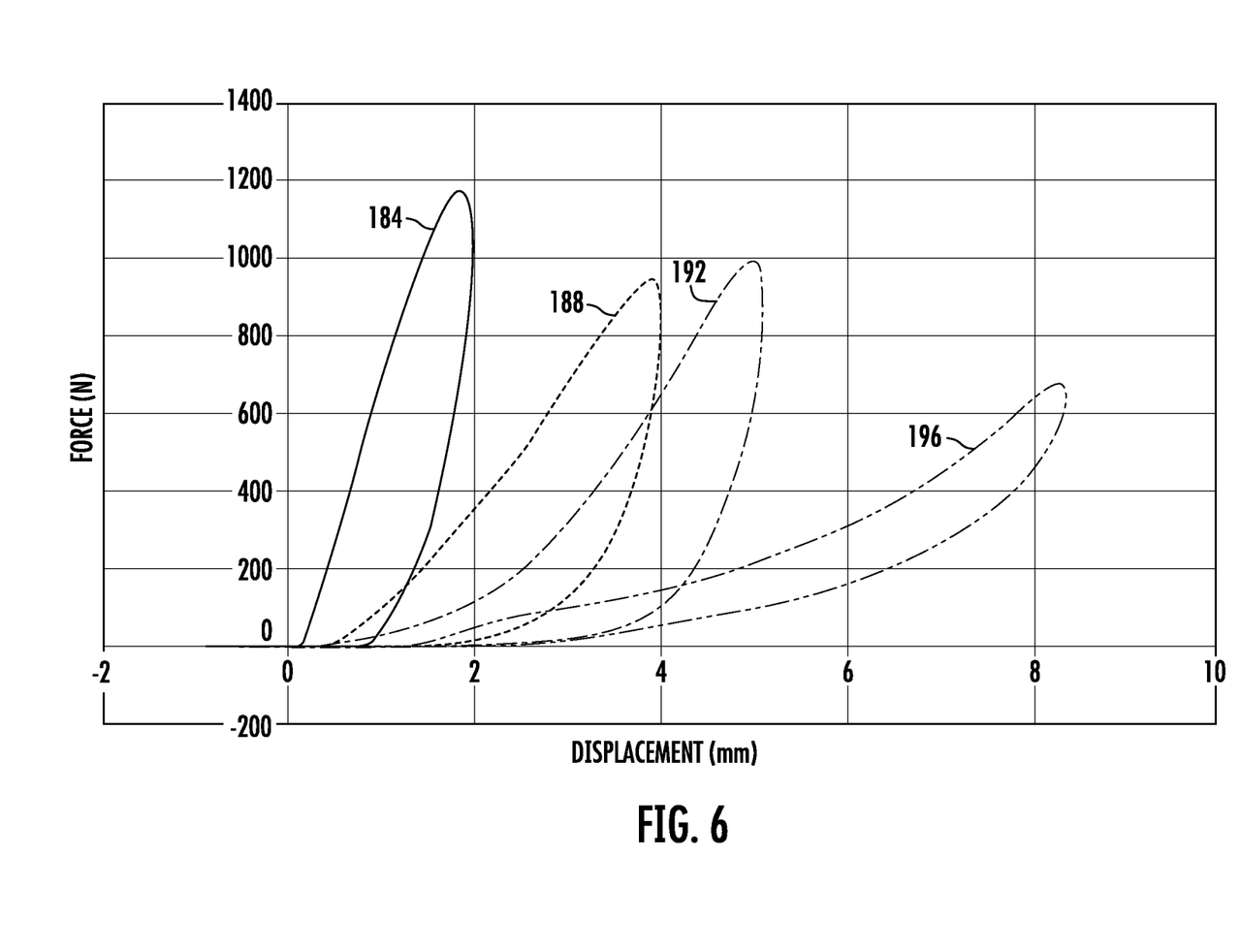
FIG. 6 is a graph of force versus time as applied to various products including the auxetic panels of FIG. 1.

With reference to FIG. 6, two types of auxetic panels 104 are subject to an impact test and the results are compared to a silicone slab substrate and a hexfoam layer. In the test, baseline curve 184 corresponds to a baseline machine calibration in which an 8.5 kg free weight (not shown) is dropped onto a slab of silicone rubber (not shown and also referred to herein as a silicone slab substrate). The measured displacement is the compressive movement of the silicone rubber in response to the impact from the free weight. The comparatively dense silicone rubber exhibits little displacement (i.e. less than 2 mm) and absorbs almost 1200N of force. The silicone rubber establishes the baseline curve 184 or reference curve against which three foam products are compared.

The curve 188 corresponds to a test of a first auxetic panel 104, as disclosed herein, having a first auxetic layer 112 with a first density. During the test, the auxetic panel 104 is positioned on the silicone slab and the free weight is dropped onto the auxetic panel 104, such that the auxetic panel 104 is compressed between the free weight and the silicone slab. The displacement of the curve 188 is a measure of how much the auxetic panel 104 was compressed by the free weight along the axis 156. According to the curve 188, the first auxetic panel 104 absorbed about 950N of force and was displaced by almost 4 mm.

The curve 192 corresponds to a second auxetic panel 104, as disclosed herein, having a second auxetic layer 112 with a second density. For example, the second density of the second auxetic panel may be less than the first density of the first auxetic panel 104. The second auxetic panel 104 was subject to the same test. According to the curve 192, the second auxetic panel 104 absorbed about 1000N of force and was displaced by almost 5 mm.

The curve 196 corresponds to a test of a non-auxetic pad (not shown) so as to determine quantitative benefits for impact protection provided by the auxetic panels 104. The non-auxetic pad includes a hexfoam layer (not shown) that is non-auxetic. There are no auxetic components included in the non-auxetic pad, and the non-auxetic pad does not include the bonding layer 116 having the openings 160. The hexfoam is provided as one of the foams manufactured D3O®. The non-auxetic pad was subject to the same test as the two auxetic panels described above. According to the curve 196, the non-auxetic pad absorbed about 650N of force and was displaced by slightly over 8 mm.

In the graph of FIG. 6, the first and second auxetic panels 104 provide better impact protection than the non-auxetic pad without excessive displacement. Specifically, the auxetic panels 104 absorbed 300N and 350N more, respectively, than was absorbed by the non-auxetic pad. The first and second auxetic panels 104, therefore, performed better as an impact absorbing layer by absorbing more force than the non-auxetic pad.

Additionally, the first and second auxetic panels 104 exhibited more displacement than the silicone slab, but less displacement than the non-auxetic pad. During experimentation, it was discovered that the silicon slab is too heavy and does not offer enough displacement to comfortably cushion impacts. Moreover, the silicon slab does not sufficiently conform to the body, such as around joint region 136 and joints, such as knees 140, elbows, hips, and other highly curved body regions. Further, during experimentation, it was discovered that the non-auxetic pad with the D30® foam exhibited too much displacement and transferred too much force to the body. The non-auxetic pad was too squishy and not dense enough to stay properly in position.

The auxetic panels 104 of the curves 188 and 192 provide a desirable level of impact protection, are lightweight, and conform to the body very well. Thus, the auxetic panels 104 provide an optimized level of impact protection, while also being comfortable, and lightweight.

In the embodiments described above, the auxetic panels 104 are positioned on an outside surface of the base fabric layer 108 that forms the article of apparel 100. In another embodiment, the auxetic panels 104 are positioned on an inside surface of the base fabric layer 108, such that the outer fabric layer 120 is positioned towards the wearer's skin and is on the inside of the article of apparel 100.

Figure 7:
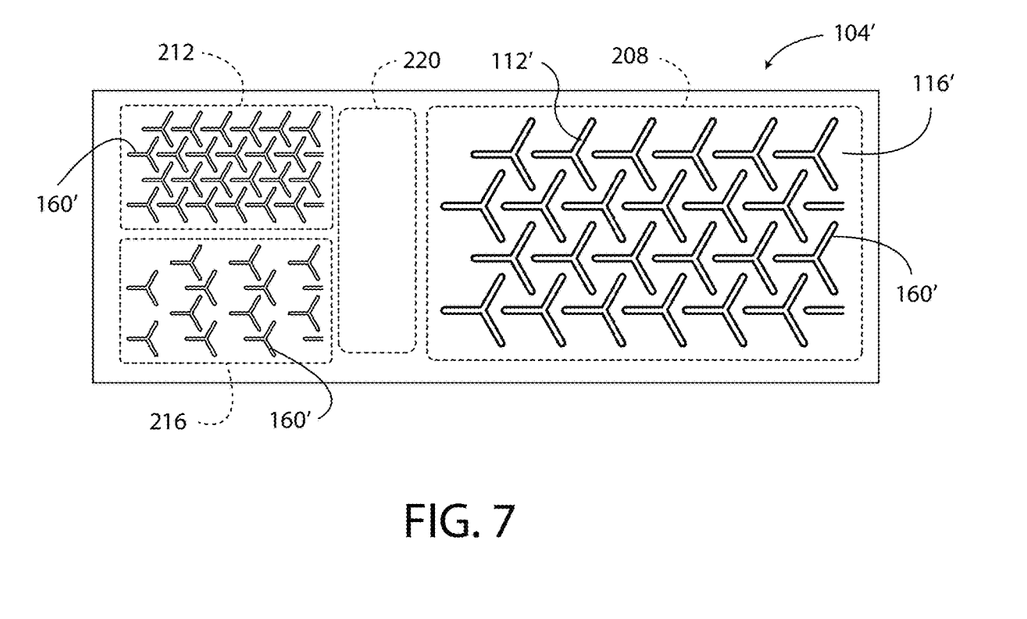
FIG. 7 is a top plan view showing a bonding layer of an alternative embodiment of an auxetic panel including regions of tuned auxetic response.

As shown in FIG. 7, in another embodiment, an auxetic panel 104' is substantially the same as the auxetic panel 104 except that the auxetic panel 104' includes a different configuration of openings 160'. In FIG. 7 corresponding parts are denoted by the same reference numeral terminated with a prime symbol. FIG. 7 is top view of the auxetic panel 104' shown with the outer fabric layer removed so that the bonding layer 116' is visible. The auxetic layer 112' is shown through the openings 160'.

The size and the concentration of the openings 160' in the bonding layer 116' is used to tune, enhance, attenuate, and/or control the auxetic response of the auxetic layer 112'. The auxetic panel 104' includes a portion 208' and three tuned portions 212', 216', 220', which exhibit a different auxetic response than the portion 208'. In general, the openings 160' are formed in areas in which an auxetic response is desired, and the openings 160' are not formed in areas in which the auxetic response is not desired or should be diminished. The portion 212' has smaller openings 160' and an increase in the concentration or density of the openings 160' (i.e. more openings per unit area). As such, the portion 212' tends to result in the enhancement of the auxetic response of the auxetic layer 112', and the portion 212' may exhibit a greater auxetic response than the portion 208', in response to the same force. The portion 216' has a decrease in density and size of the openings 160' and tends to attenuate the auxetic response of the auxetic layer 112'. The portion 220' with none of the openings 160' further reduces the auxetic response. Decreasing or eliminating the openings 160' attenuates, dampens, and/or diminishes the auxetic response because without the openings 160', the bonding layer 116' resists the auxetic response of the auxetic layer 112' and prevents the auxetic movement of the auxetic layer 112'.

In an example, the configuration of the auxetic panel 104' shown in FIG. 7 positions the portion 208' over the wearer's knee where impacts are expected, and positions the portions 212', 216', and 220' near the wearer's lower thigh where, in this example, impacts are less expected.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

It will be appreciated that the foregoing aspects of the present disclosure, or any parts or functions thereof, may be implemented using hardware, software, firmware, tangible non-transitory computer readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An article of apparel comprising:
   an auxetic foam layer;
   a fabric layer; and
   a bonding layer located between the auxetic foam layer and the fabric layer in a first portion and a second portion of the article of apparel, the bonding layer including a plurality of openings configured to at least partially control an auxetic response of the auxetic foam layer in the first portion and the second portion of the article of apparel, each of the openings defining a reentrant shape, wherein the openings in the first portion of the article of apparel are defined by a first size and a first density, wherein the openings in the second portion of the article of apparel are defined by a second size and a second density, and wherein the second size is smaller than the first size and the second density is greater than the first density.

2. The article of apparel as claimed in claim 1, wherein the bonding layer includes a heat-activated adhesive configured to bond to the auxetic foam layer and the fabric layer.

3. The article of apparel as claimed in claim 1, wherein:
   the fabric layer includes a four-way stretch fabric, and
   the bonding layer includes a polymer film.

4. The article of apparel as claimed in claim 1, wherein the fabric layer is a first fabric layer, the article of apparel further comprising:
   a second fabric layer,
   wherein the auxetic foam layer is located between the bonding layer and the second fabric layer.

5. The article of apparel as claimed in claim 1, wherein each of the openings has a same shape and a same orientation.

6. The article of apparel as claimed in claim 1, wherein the plurality of openings configures the bonding layer as an auxetic.

7. The article of apparel as claimed in claim 1, wherein:
   the auxetic foam layer is configured to exhibit an auxetic response to a compressive force perpendicular to a surface of the bonding layer; and the bonding layer is configured to exhibit an auxetic response to tensile forces perpendicular to the compressive force.

8. An article of apparel comprising:
an auxetic foam layer arranged in a first portion and a second portion of the article of apparel; and
a bonding layer bonded to the auxetic foam in the first portion and the second portion of the article of apparel, the bonding layer including a plurality of openings configured to at least partially control an auxetic response of the auxetic foam layer, each of the openings defining a reentrant shape, wherein a density of the plurality of openings in the second portion of the article of apparel is greater than a density of the plurality of openings in the first portion of the article of apparel, and wherein the plurality of openings configures the bonding layer as an auxetic.

9. The article of apparel of claim 8, wherein the auxetic foam layer is auxetic in three dimensions, and
the bonding layer is auxetic in only two dimensions.

10. The article of apparel as claimed in claim 9, wherein a size of the openings in the second portion of the article of apparel is less than a size of the openings in the first portion of the article of apparel.

11. The article of apparel as claimed in claim 10, wherein the openings in the second portion of the article of apparel have a same shape as the openings in the first portion of the article of apparel.

12. The article of apparel as claimed in claim 8, wherein:
the auxetic foam layer is configured to exhibit an auxetic response to a compressive force perpendicular to a surface of the bonding layer; and
the bonding layer is configured to exhibit an auxetic response to tensile forces perpendicular to the compressive force.

13. The article of apparel as claimed in claim 8, further comprising:
a fabric layer,
wherein the bonding layer is located between the fabric layer and the auxetic foam layer, and
wherein the fabric layer includes a four-way stretch fabric.

14. The article of apparel as claimed in claim 13, wherein the bonding layer includes a polymer film having a heat-activated adhesive configured to bond to the auxetic foam layer and the fabric layer.

15. An article of apparel comprising:
an auxetic layer that is auxetic in three dimensions; and
a bonding layer bonded to the auxetic layer in a first portion and a second portion of the article of apparel, the bonding layer auxetic in only two dimensions and configured to at least partially control an auxetic response of the auxetic layer, wherein the bonding layer includes a first plurality of reentrant shaped openings in the first portion and a second plurality of reentrant shaped openings in the second portion, wherein the first plurality of reentrant shaped openings are differently configured than the second plurality of reentrant shaped openings such that the auxetic response of the auxetic layer in the first portion of the article of apparel is different than the auxetic response of the auxetic layer in the second portion of the article of apparel.

16. The article of apparel as claimed in claim 15, wherein each of the openings has a same shape and a same orientation.

17. The article of apparel as claimed in claim 15, further comprising:
a first fabric layer; and
a second fabric layer,
wherein the bonding layer is located between the first fabric layer and the auxetic layer, and
wherein the auxetic layer is located between the bonding layer and the second fabric layer.

18. The article of apparel as claimed in claim 15, wherein:
the auxetic layer is configured to exhibit an auxetic response to a compressive force perpendicular to a surface of the bonding layer; and
the bonding layer is configured to exhibit an auxetic response to tensile forces perpendicular to the compressive force.

19. The article of apparel as claimed in claim 18, wherein:
the auxetic layer includes an auxetic foam, and
the bonding layer includes a polymer film.

20. The article of apparel as claimed in claim 15, wherein the second plurality of reentrant shapes have a greater density in the second portion of the article of apparel than the first plurality of reentrant shapes in the first portion of the article of apparel.

* * * * *